United States Patent [19]

Damiron et al.

[11] Patent Number: 4,604,157
[45] Date of Patent: Aug. 5, 1986

[54] ACID PICKLING TANK FOR METAL STRIPS

[75] Inventors: Pierre M. Damiron; Jean-Luc Legoupil, both of Paris; Jacques Brosson, Riom, all of France

[73] Assignee: Clecim, Paris, France

[21] Appl. No.: 734,207

[22] Filed: May 15, 1985

[51] Int. Cl.[4] .............................................. C23F 1/02
[52] U.S. Cl. .................. 156/345; 134/122 R; 134/201
[58] Field of Search ............... 156/345; 134/122 R, 134/201

[56] References Cited

U.S. PATENT DOCUMENTS

| | | | |
|---|---|---|---|
| 1,899,413 | 2/1933 | Fritz | 206/524.2 |
| 2,121,139 | 6/1938 | Clauss et al. | 134/84 |
| 2,676,599 | 4/1954 | McHenry | 134/122 R |
| 3,087,505 | 4/1963 | Laine | 134/122 R |
| 3,095,463 | 6/1963 | Chang et al. | 156/345 X |

FOREIGN PATENT DOCUMENTS 670757 8/1929 France .
1141076 3/1957 France .

Primary Examiner—Arthur Kellogg
Attorney, Agent, or Firm—Pollock, Vande Sande & Priddy

[57] ABSTRACT

The invention relates to an acid pickling tank for metal strips with a width equal to or greater than 0.50 meter.

The tank incorporates an external supporting structure (1) and a metal casing (3) coating internally with rubber (6). The rubber layer (6) is lined internally with large slabs (10a, 10b) of a natural rock of volcanic origin, which has a total $SiO_2$ and $Al_2O_3$ content greater than 60%, a porosity of between 6 and 30% and a relative density of less than 3. At most three slabs (10b) are placed side by side along the width of the tank and at most one slab (10a) is placed along its height. The minimum dimensions of a slab (10a or 10b) are 0.50×0.50 meter.

The invention is applicable in particular to the pickling of strips of hot-rolled metal sheets.

7 Claims, 3 Drawing Figures

ACID PICKLING TANK FOR METAL STRIPS

FIELD OF THE INVENTION

The invention relates to an acid pickling tank for metal strips with a width equal to or greater than 0.50 meter.

PRIOR ART

Hot-rolled metal strips intended to be cold-rolled later must be subjected, before this cold-rolling to a pickling operation capable of removing the oxide formed on their surface at the end of the hot rolling or other deposits or incrustations likely to become embedded in the sheet when it is cold-rolled.

Pickling of the metal sheets before they are cold-rolled is generally carried out in tanks of very great length containing a solution of hot sulphuric or hydrochloric acid. The metal sheet or strip, with a width equal to or greater than 0.50 m is guided in its travel to enter the tanks and to pass through them while immersed in the acid solution.

The sheet then passes through rinsing tanks which make it possible to remove the acid remaining on the surface of the sheet.

The pickling tanks are generally of very great length, of the order of 20 to 25 meters and have a cross-section which is uniform over their entire length. This cross-section depends on the maximum width of the strips which it is intended to pickle.

The pickling tank incorporates a supporting structure and an outer casing made of steel which provides the tank with mechanical strength. It is necessary to avoid any contact of the acid solution with the steel part of the pickling tank and to insulate it thermally from the acid solution, which is at a relatively high temperature. The steel wall of the pickling tanks is therefore covered with a layer of rubber, itself lined with at least one layer of alumino-silicate bricks.

The alumino-silicate bricks are not attacked by sulphuric (110° C.) or hydrochloric (85° C.) acid and permit satisfactory thermal insulation between the hot acid solution and the metal casing of the tank. In addition, these bricks withstand the wear caused by the rubbing of the steel strip passing through the tank.

The operation of internal brick lining of the pickling tank is very long and must be carried out with great care by qualified personnel. The bricks must be laid side by side uniformly and bonded by joints made of an acid-resistant cement. These joints must be perfectly leakproof to prevent any infiltration of acid through the brick layer. Because of the large number of bricks which are employed, the total number of joints for a pickling tank is extremely large and it is very difficult to ensure perfect quality of all these joints.

The life time of a pickling tank is consequently greatly dependent on the quality of its brick lining. By using several superposed layers of bricks the risks of infiltration through the joints is reduced but the brick lining operations are still longer and more costly.

SUMMARY OF THE INVENTION

To overcome such disadvantages, the inventor offers a new method of producing the brick lining of a pickling bath which makes it possible to simplify the operations of lining or relining of the internal surface, while restricting the infiltrations of acid through the layer of acid-resistant slabs, which makes it possible to ensure a longer lifetime of the pickling tank.

To this end, according to the invention, the inner layer in contact with the acid consists of slabs placed side by side, of such dimensions that the bottom of the tank is covered in the width direction by at most three slabs and that the side and end walls are covered over their entire height by a single slab, and the said slabs consist of a natural rock of volcanic origin which has a total $SiO_2$ and $Al_2O_3$ content of at least 60%, a porosity of between 6 and 30% and a relative density of less than 3.

To make the invention properLy understood, a description will now be given, by way of a non-restrictive example, with reference to the attached figures, of an embodiment of a pickling tank according to the invention.

DETAILED DESCRIPTION

Figure 1:
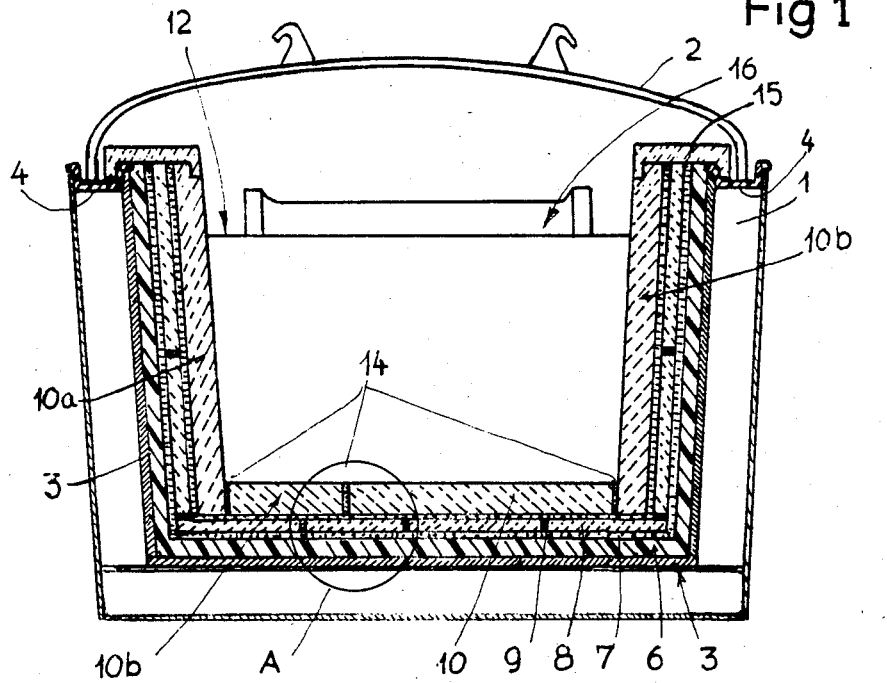
FIG. 1 is a cross-section of a pickling tank according to the invention.

FIG. 1 shows the steel part 1 of the tank which forms the supporting structure responsible for the mechanical strength and the support of the tank 3. The upper part of this structure 1 consists of two ledges 4 on which is placed the pickling tank cover 2.

The inner surface of the vessel 3 and the top surface of the ledges 4 are covered with a layer of rubber 6 which has good acid resistance.

Figure 1A:
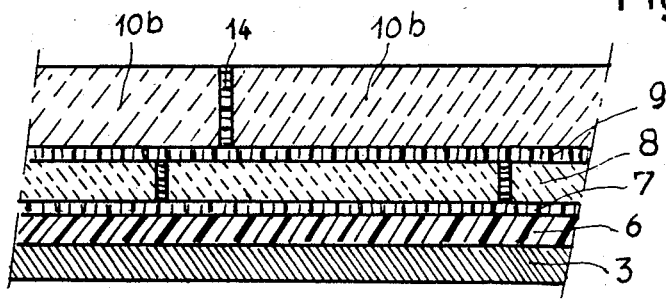
FIG. 1a is an enlarged view of the detail A in FIG. 1, showing the various layers forming the wall of the pickling tank.

The structure of the various layers of the pickling tank can be seen with simultaneous reference to FIGS. 1 and 1a. The rubber layer 6, on the inner surface of the vessel 3, is covered by a first, thermally insulating brick layer, resistant to the hot acid 8, and bonded to the rubber by a layer 7 of acid-resistant cement. The layer 8 is itself separated from a second, thermally insulating and acid-resistant slab layer 10, of greater thickness, through the intermediacy of a layer 9 of acid-resistant cement.

The layer 8 and the insulating refractory layer 10 consist of the same material, which will be defined later.

The inner layer 10, which is in contact with the acid filling the pickling tank to the level 12 consists of large-sized slabs 10a, 10b, while the slabs forming the inner layer 8 are smaller in size. The vertical walls of the tank are covered over their entire height by a single slab 10a. The bottom of the tank is covered by two slabs 10b placed side by side along one of their lateral sides. For the whole of the inner layer 10 there are thus only three joints 14 which will be made using an acid-resistant cement of the same type as that forming the connecting layer 9 between the slab layers 8 and 10.

The various layers forming the vertical walls of the pickling tank are assembled in their top part by virtue of U-shaped pieces 15, made of the same material as the slabs 8 and 10.

To produce the large-sized slabs such as 10a and 10b use has been made of Volvic lava, which can be obtained in the form of uniform slabs of a large size, for example ranging up to one meter by two meters forty.

Volvic lava is a rock of volcanic origin of the andesite type, the known acid-resistance properties of which are quite remarkable.

In addition, this material has great resistance to wear, to thermal or mechanical shocks, and good thermal insulating characteristics.

The chemical composition of Volvic lava is given by the following table:

| | |
|---|---|
| Silica | 55 to 60% |
| Alumina as $Al_2O_3$ | 18 to 22% |
| Lime as CaO | 4.5 to 5.5% |
| Iron as $Fe_2O_3$ | 6.5 to 7.5% |
| Magnesia as MgO | 2.5 to 3.5% |
| Alkalis as $K_2O$ and $Na_2O$ | 5% |

The good acid resistance of this rock is due to a high total content of silica and alumina (between 73 and 82%). When placed in contact with acid, this rock undergoes a weight loss of approximately 3% at the beginning of the attack, which corresponds to the removal of iron by the acid. Subsequently, the acid resistance is very good and the weight loss nil.

The total porosity of Volvic lava is high, with the result that this rock has good thermal insulating characteristics and a low relative density, of the order of 2.3.

Sheet-guiding thresholds 16, such as shown in FIG. 1, are arranged at the entry and the exit of the pickling tanks, these guiding components being also made of Volvic lava.

In the case of the pickling of metal sheets with a maximum width of 1.40 meters, use is made of a pickling tank such as shown in FIG. 1, the bottom of which has a width which is slightly greater than 2 meters and the walls a height in the region of 1.50 meters. The depth of acid in the tank is kept at a value in the region of 1.25 meters.

In this case, the slabs 10a have a length of 1.50 meters and their longitudinal dimension is in the region of 1 meter. The slabs 10b forming the bottom of the tank have dimensions, depending on the width of the tank, which are respectively in the region of 0.50 meter and 1.50 meters. Their dimension in the direction of the length of the tank is also in the region of 1 meter. The tank will thus consist, in its layer 10 of a succession of plates such 10a and 10b, forming transverse sections of the tank, 1 meter in length.

Expansion joints consisting, for example, of a highly compressible, acid-resistant rubber will be arranged between some sections, depending on the length of the tank. An additional layer consisting of a resilient, acid-resistant rubber may also be inserted between the layers 8 and 10.

The inner layer 8, which is not subjected to direct contact with the acid, but which ensures better confinement of the acid, consists of Volvic lava slabs of smaller dimensions and greater in number than in the inner layer 10. The joints of these smaller-size slabs forming the layer 8 are in positions which are opposite relative to the joints of the large-sized slabs of the layer 10. These joints are made of an acid-resistant cement. Depending on the length of the tank, the inner layer 8 is sectioned into several parts which are separated by expansion joints made of acid-resistant rubber.

In the case of a tank which makes it possible to process sheets up to a width of the order of 1.40 meters, as described previously, use has been made of slabs 10a and 10b with a thickness of 0.12 meter and of slabs for forming the layer 8 with a thickness in the region of 0.05 meter.

In the case where a layer of acid-resistant rubber is inserted between the layers 8 and 10, an additional acid-containing barrier is produced thereby and the possibilities of thermal expansion which characterize each layer are improved.

Figure 1B:
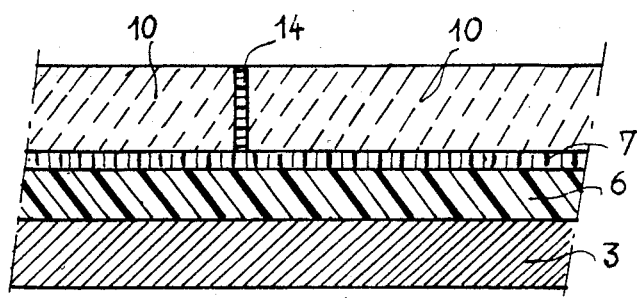
FIG. 1b is a view similar to FIG. 1a, showing a simplified alternative embodiment of the wall of the pickling tank.

FIG. 1b shows a simplified embodiment of the wall of a pickling tank in which the layers corresponding to those which were described with reference to FIG. 1a bear the same references.

The steel vessel 3 is covered with a layer of rubber 6 which is itself lined with thick, large-sized slabs comparable to the slabs 10a and 10b shown in FIG. 1. These slabs are assembled together and/or with the rubber layer with a cement forming a layer 7 and joints 14.

The structure of the wall of the pickling tank shown in FIG. 1b does not make it possible to achieve performances which are as good as those of the structure 1a insofar as the life time of the tank and the possibility of insulating this wall are concerned. However, the construction and the relining of the tank are considerably simplified and the performance of the pickling tank remains acceptable.

It can be seen that the chief advantages of the pickling tank according to the invention are to permit a rapid lining or relining of this tank by virtue of the use of slabs of much greater dimensions than the bricks according to the prior art, to reduce greatly the number of the joints, which makes it possible greatly to reduce the infiltrations of acid under the layers 8 and 10 and to improve their thermal insulation capability.

The invention is not restricted to the embodiment which has been described.

Thus, instead of Volvic lava it is possible to use any other volcanic rock of the andesite type or even of another type, so long as this rock has good properties in respect of its resistance to hot acid, good thermal insulation characteristics, and can be produced in the form of slabs of a size of the order of 1 meter×0.5 meter and at least 0.50 meter×0.50 meter.

It is possible to use slabs with a width of less than 1 meter which is arranged in the length direction of the tank in the case of the layer 10 but, to avoid the presence of too many joints and acid infiltrations such as are observed in the case of brick linings, a reduction below a width of 0.50 meter should be avoided. Equally, the length of the slabs in the height or width direction of the tank should not be less than 0.50 meter.

Conversely, the maximum dimensions of the slabs (8) will be restricted to permit easy handling and laying.

In general, any rock of volcanic origin the minimum silica+alumina content of which is greater than or equal to 60%, the total porosity of which is between 6 and 30% and the relative density of which is less than 3, which will resist hydrochloric acid and sulphuric acid and which has good thermal insulation characteristics, is suitable.

The Volvic lava can thus be replaced by a rock having the above properties.

Such rocks have a relative density of between 1.5 and 3.

In general, for pickling tanks for metal sheet the width of which is greater than 0.60 meter and can range up to 1.50 meters or over, at most three slabs laid side by side will be used to form the bottom and one slab 10 over the entire height of the vertical walls. This assumes the use of slabs 10 of a minimum size of the order of 0.50 meter. For slabs 10 of a smaller size which make it necessary to produce a greater length of joints the disadvantages of the brick lining according to the prior art are met again.

Finally, the pickling tank according to the invention can be used not only for pickling using sulphuric acid but also for pickling using hydrochloric acid or using other acids, with the exception of hydrofluoric acid. It is also possible to use tanks according to the invention for rinsing strips after pickling, these tanks being intended to contain a solution at a much lower concentration of acid and at a more moderate temperature.

What is claimed is:

1. Acid pickling tank for metal strips with a width equal to at least 0.50 m, comprising a metal casing in the form of a vessel of a great length and with a uniform cross-section, incorporating two side walls, two end walls and a plane bottom, the said vessel being supported by an external structure and covered internally with a layer of rubber, the said rubber layer being itself internally lined with an inner layer made of an acid-resistant material, the said inner layer in contact with the acid consisting of slabs laid side by side, of such dimensions that the bottom of the tank is covered in the width direction by at most three slabs and that the side and end walls are covered over their entire height by a single slab, the said slabs consisting of a natural rock of volcanic origin which has a total $SiO_2$ and $Al_2O_3$ of at least 60%, a porosity of between 6 and 30% and a relative density of less than 3.

2. Acid pickling tank for metal strips with a width of at least 0.50 m, comprising a metal casing in the form of a vessel of a great length and with a uniform cross-section, incorporating two side walls, two end walls and a plane bottom, the said vessel being supported by an external structure and internally coated with a layer of rubber, the said rubber layer being itself internally lined with at least two superposed layers, an inner layer in contact with the acid and an intermediate layer respectively, the said inner and intermediate layers consisting of slabs laid side by side and made of a natural rock of volcanic origin which has a total $SiO_2$ and $Al_2O_3$ content of at least 60%, a porosity of between 6 and 30% and a relative density of less than 3, the inner layer in contact with the acid consisting of slabs laid side by side, of such dimensions that the bottom of the tank is covered in the width direction by at most three slabs and that the side and end walls are covered over their entire height by a single slab and that the intermediate layer consists of slabs of lower thickness and of smaller area than the slabs of the inner layer, the connecting joints of the slabs of the intermediate layer being offset relative to the connecting points of the slabs of the inner layer.

3. Pickling tank as claimed in claim 1, wherein the inner layer is bonded to the rubber layer by a layer of acid-resistant cement.

4. Pickling tank as claimed in claim 2, wherein the inner layer is bonded to the intermediate layer and the latter to the rubber layer through the intermediacy of layers of an acid-resistant cement.

5. Pickling tank as claimed in claim 2, wherein the layers of acid-resistant material are separated by a layer of highly resilient rubber which resists hot acid.

6. Pickling tank as claimed in claim 1, wherein the slabs are made of a volcanic rock of the andesite type such as Volvic lava.

7. Pickling tank as claimed in claim 2, wherein the slabs are made of a volcanic rock of the andesite type such as Volvic lava.

* * * * *